(12) United States Patent
Greenall et al.

(10) Patent No.: US 10,596,787 B2
(45) Date of Patent: *Mar. 24, 2020

(54) GLAZING

(75) Inventors: Michael Robert Greenall, Clayton-le-Woods (GB); Ashley Carl Torr, Aughton (GB); Jonathan Peter Voss, Croston (GB)

(73) Assignees: PILKINGTON GROUP LIMITED, Merseyside (GB); PILKINGTON AUTOMOTIVE LIMITED, Merseyside (GB)

( * ) Notice: Subject to any disclaimer, the term of this patent is extended or adjusted under 35 U.S.C. 154(b) by 651 days.

This patent is subject to a terminal disclaimer.

(21) Appl. No.: 12/297,587

(22) PCT Filed: Apr. 20, 2007

(86) PCT No.: PCT/GB2007/050204
§ 371 (c)(1),
(2), (4) Date: Dec. 3, 2008

(87) PCT Pub. No.: WO2007/122428
PCT Pub. Date: Nov. 1, 2007

(65) Prior Publication Data
US 2009/0176101 A1    Jul. 9, 2009

(30) Foreign Application Priority Data
Apr. 20, 2006   (GB) .................................. 0607745.7

(51) Int. Cl.
*B32B 17/10*  (2006.01)
*B32B 27/40*  (2006.01)
(Continued)

(52) U.S. Cl.
CPC .......... *B32B 17/1077* (2013.01); *B32B 17/10* (2013.01); *B32B 17/10055* (2013.01);
(Continued)

(58) Field of Classification Search
USPC ..................... 428/412, 442, 425.6
See application file for complete search history.

(56) References Cited

U.S. PATENT DOCUMENTS

| | | | |
|---|---|---|---|
| 2,526,728 | A | 10/1950 | Burk et al. |
| 2,528,510 | A | 11/1950 | Goldmark |

(Continued)

FOREIGN PATENT DOCUMENTS

| | | | |
|---|---|---|---|
| CN | 1526085 A | | 9/2004 |
| CN | 1555989 A | | 12/2004 |

(Continued)

OTHER PUBLICATIONS

Form PCT/ISA/210 (International Search Report) dated Aug. 13, 2007.

(Continued)

*Primary Examiner* — Tahseen Khan
(74) *Attorney, Agent, or Firm* — Buchanan, Ingersoll & Rooney, PC (57) ABSTRACT

A laminated glazing comprises two plies of glass having an interlayer structure laminated therebetween. The interlayer structure comprises a first sheet of an interlayer material framing a suspended particle device film incorporated therein. The interlayer material is chosen to minimize the migration of the components of the interlayer material into the suspended particle device film. Preferably, the interlayer material does not contain plasticizers, or contains a plasticizer which does not diffuse into the suspended particle device film structure.

24 Claims, 4 Drawing Sheets

(51) Int. Cl.
  *B32B 27/36* (2006.01)
  *E06B 9/24* (2006.01)
(52) U.S. Cl.
  CPC .. *B32B 17/10174* (2013.01); *B32B 17/10339* (2013.01); *B32B 17/10357* (2013.01); *B32B 17/10532* (2013.01); *B32B 17/10651* (2013.01); *B32B 17/10761* (2013.01); *B32B 17/10788* (2013.01); *E06B 9/24* (2013.01); *Y10T 428/31507* (2015.04); *Y10T 428/31601* (2015.04); *Y10T 428/31649* (2015.04)

(56) References Cited

U.S. PATENT DOCUMENTS

| | | | |
|---|---|---|---|
| 3,317,906 A | | 5/1967 | Baldridge |
| 3,569,614 A | | 3/1971 | Hanlon |
| 3,836,231 A | * | 9/1974 | Cole, Jr. ........... G02F 1/133345 349/132 |
| 4,273,962 A | | 6/1981 | Wolfe |
| 4,312,972 A | | 1/1982 | Khanna |
| 4,368,945 A | | 1/1983 | Fujimori |
| 4,749,261 A | | 6/1988 | McLaughlin et al. |
| 4,799,745 A | | 1/1989 | Meyer et al. |
| 4,911,984 A | | 3/1990 | Parker |
| 4,950,052 A | | 8/1990 | Fergason |
| 4,956,121 A | | 9/1990 | Tymon et al. |
| 4,973,511 A | * | 11/1990 | Farmer et al. ................. 428/216 |
| 5,208,080 A | | 5/1993 | Gajewski et al. |
| 5,239,406 A | | 8/1993 | Lynam |
| 5,268,049 A | * | 12/1993 | Marriott et al. ................. 156/99 |
| 5,336,965 A | | 8/1994 | Meyer et al. |
| 5,773,102 A | | 6/1998 | Rehfeld |
| 5,830,568 A | | 11/1998 | Kondo |
| 5,932,329 A | | 8/1999 | Frost |
| 6,039,390 A | | 3/2000 | Agrawal et al. |
| 6,042,947 A | | 3/2000 | Asakura |
| 6,055,088 A | | 4/2000 | Fix et al. |
| 6,119,807 A | | 9/2000 | Benson, Jr. et al. |
| 6,466,298 B1 | | 10/2002 | Fix |
| 6,538,192 B1 | | 3/2003 | Coster et al. |
| 6,795,226 B2 | | 9/2004 | Agrawal et al. |
| 2002/0094407 A1 | | 7/2002 | Frost |
| 2003/0143371 A1 | | 7/2003 | Conway et al. |
| 2003/0224182 A1 | * | 12/2003 | Simpson et al. ............... 428/437 |
| 2003/0228476 A1 | | 12/2003 | Buhay |
| 2004/0028953 A1 | | 2/2004 | Kraemling |
| 2004/0169789 A1 | | 9/2004 | Mathey et al. |
| 2004/0237430 A1 | | 12/2004 | Reul |
| 2004/0257649 A1 | | 12/2004 | Heikkila et al. |
| 2005/0001456 A1 | | 1/2005 | Bohm et al. |
| 2005/0136243 A1 | * | 6/2005 | Fisher ........................... 428/323 |
| 2005/0227061 A1 | | 10/2005 | Slovak et al. |
| 2005/0233125 A1 | * | 10/2005 | Anderson et al. ............ 428/221 |
| 2005/0238857 A1 | | 10/2005 | Day |
| 2006/0152137 A1 | | 7/2006 | Beteille |
| 2006/0246300 A1 | * | 11/2006 | Hevesi ........................... 428/432 |
| 2008/0193686 A1 | * | 8/2008 | Loergen et al. ................. 428/34 |
| 2009/0176101 A1 | | 7/2009 | Greenall et al. |
| 2009/0279004 A1 | | 11/2009 | Greenall et al. |

FOREIGN PATENT DOCUMENTS

| | | |
|---|---|---|
| DE | 2 331 414 A1 | 1/1974 |
| DE | 100 43 141 A1 | 3/2002 |
| EP | 0 343 419 A2 | 11/1989 |
| EP | 0436283 A2 | 7/1991 |
| EP | 0 852 999 A2 | 7/1998 |
| EP | 0 763 420 B2 | 3/2000 |
| EP | 1 372 004 A1 | 12/2003 |
| EP | 1 171 294 B1 | 2/2005 |
| EP | 1 696 706 A1 | 8/2006 |
| JP | S56-32352 | 4/1981 |
| JP | 364-51642 U | 3/1989 |
| JP | H02-188238 A | 7/1990 |
| JP | H03-197231 | 8/1991 |
| JP | H3-93124 U | 9/1991 |
| JP | H07-306394 A | 11/1995 |
| JP | H09-118548 | 5/1997 |
| JP | H09-175844 | 7/1997 |
| JP | 10114007 A | 5/1998 |
| JP | H10-227907 A | 8/1998 |
| JP | 2000-117919 A | 4/2000 |
| JP | 2000219541 A | 8/2000 |
| JP | 2001039742 A | 2/2001 |
| JP | 2002-214653 A | 7/2002 |
| JP | 2003055006 A | 2/2003 |
| JP | 2004189736 A | 7/2004 |
| JP | 2004196559 A | 7/2004 |
| JP | 2004527894 A | 9/2004 |
| JP | 2006-064832 A | 3/2006 |
| WO | WO 00/61366 A1 | 10/2000 |
| WO | WO 02/072408 A1 | 9/2002 |
| WO | 02/098179 A1 | 12/2002 |
| WO | 03057479 | 7/2003 |
| WO | WO 03/057479 A2 | 7/2003 |
| WO | WO 2004/034483 A1 | 4/2004 |
| WO | 2005/017580 A1 | 2/2005 |
| WO | WO 2005/102688 A2 | 11/2005 |
| WO | WO 2005102688 A2 * | 11/2005 |
| WO | WO 2006108980 A2 * | 10/2006 |
| WO | 2007/122429 A1 | 11/2007 |
| WO | WO 2007/122426 A1 | 11/2007 |
| WO | WO 2007/122428 A1 | 11/2007 |

OTHER PUBLICATIONS

Form PCT/IPEA/409 (International Preliminary Report on Patentability).
Search Report under Section 17(5), issued in priority application No. GB0607745.7, dated Aug. 4, 2006, The Patent Office, South Wales, UK.
Research Disclosure Journal, "Lamination of functional devices in glazing", Research Disclosure Database No. 479004, Mar. 2004, 2 pgs.
Pilkington Architectural, "Pilkington Planar Laminated Insulating Glass Units (IUGs)", Sep. 2004, 2 pgs.
Deerfield Urethane, "Dureflex® Optical Aliphatic Polyether Polyurethane Grade" Product Data Sheet A4700, 2 pages, (month and year of publication unknown).
Pilkington, "Pilkington Planar™ Laminated IGUs" Product Specification Data Sheet, 2 pages, Sep. 2004.
"Mylar® and Polyester Film & Sheets", found at: http://abs-rods-sheets.com/polyester/index, 1 page, Aug. 19, 2010.
Dupont, "Nucrel®: ethylene acid copolymer resin," found at: http://www2.dupont.com/Nucrel/en_US/assets/downloads/nucrel_overview.pdf, 3 pages, Sep. 10, 2005.
Sekisui Chemical Singapore (PTE.) LTD. "High Performance Interlayer Films: S-LEC EN Film Decorative EVA Interlayer Film," found at: http://www.sekisui.com.sg/product_pages/s-lec/eng/html/hp_film/en.html, 1 page, 2003 (month unknown).
Opposition papers filed by Research Frontiers Incorporated on Oct. 14, 2010 in European Patent No. 2 013 013, and Opposition papers filed by AGC Glass Europe on Oct. 18, 2010 in European Patent No. 2 013 013, with English language translation.
Submission in Opposition Proceedings submitted by Research Frontiers Incorporated on Aug. 30, 2011 in European Patent No. 2013013 which corresponds to U.S. Appl. No. 12/297,587.
Tex Wire.Wire & Cable Technical Resources [online], [retrieved Jul. 19, 2011]. Retrieved from the Internet, URL: <http://texwire.us/cablewire/pvcproperties.hml>.
Saunders, K.J. "An Introduction to the Organic Chemistry of Adhesives, Fibres, Paints, Plastics and Rubbers," Organ Polymer chemistry, Second Edition, 1988, Chapman & Hall, Great Britain.
Submission in Opposition Proceedings submitted by Research Frontiers Incorporated on Jul. 26, 2013 in European Patent No. 2013013 which corresponds to U.S. Appl. No. 12/297,587.
Submission in Opposition Proceedings submitted by AGC Glass Europe SA on Feb. 14, 2013 in European Patent No. 2013013 which corresponds to U.S. Appl. No. 12/297,587.

(56) References Cited

OTHER PUBLICATIONS

Summons to Attend Oral Proceedings Pursuant to Rule 115(1) EPC issued on Mar. 15, 2013 by the European Patent Office in European Patent No. 2013013 which corresponds to U.S. Appl. No. 12/297,587.
G.M. Sottile, "2004 Survey of United States Architects on the Subject of Switchable Glazings", 47th Annual Technical Conference Proceedings, 2004, pp. 1-7, ISSN 0737-5921, 2004 Society of Vacuum Coaters (7 pages).
Submission in Opposition Proceedings dated Sep. 13, 2013 submitted by AGC Glass European SA in European Patent No. 2013013 which corresponds to U.S. Appl. No. 12/297,587 and English translation (9 pages).
Minutes of the Oral Proceedings before the Opposition Division dated Sep. 26, 2013 by the European Patent Office in European Patent No. 2013013 which corresponds to U.S. Appl. No. 12/297,587 (9 pages).
Interlocutory Decision in Opposition Proceedings issued Oct. 29, 2013 by the European Patent Office in European Patent No. 2013013 which corresponds to U.S. Appl. No. 12/297,587 (19 pages).
In Response to Interlocutory Decision in Opposition Proceedings dated Oct. 29, 2013-Statement of Grounds of Appeal dated Feb. 27, 2014 submitted by Gleiss & Grosse in European Patent No. 2013013 which corresponds to U.S. Appl. No. 12/297,587 (21 pages).
Submission of Grounds of Appeal dated Feb. 27, 2014 submitted by AGC Glass European SA in European Patent No. 2013013 which corresponds to U.S. Appl. No. 12/297,587 and English translation (33 pages).
Observations on Grounds of Appeal dated Sep. 15, 2014 submitted by Research Frontiers Incorporated in European Patent No. 2013013 which corresponds to U.S. Appl. No. 12/297,587 (21 pages).
In Response to the Patentee's Reply to Our Grounds of Appeal dated Sep. 15, 2014 dated Jan. 8, 2015 submitted by Gleiss & Grosse in European Patent No. 2013013 which corresponds to U.S. Appl. No. 12/297,587 (13 pages).
Communication of the Board of Appeal Pursuant to Article 15(1) of the Rules of Procedure of the Boards of Appeal dated Feb. 6, 2015 issued by the EP Boards of Appeal in European Patent No. 2013013 which corresponds to U.S. Appl. No. 12/297,587 (10 pages).
This is in Preparation to the Oral Proceedings Scheduled for Oct. 6, 2015 dated Jul. 3, 2015 submitted by Gleiss & Grosse in European Patent No. 2013013 which corresponds to U.S. Appl. No. 12/297,587 (6 pages).
English language translation of a Notification of the First Office Action dated Jul. 1, 2014 issued by the Chinese Patent Office in the corresponding Chinese Patent Application No. 201210568306.8 (10 pages).
Notification of the Second Office Action dated Apr. 20, 2015 issued by the Chinese Patent Office in the corresponding Chinese Patent Application No. 201210568306.8 and English language translation (17 pages).
English language translation of Notification of Reason for Refusal dated Jun. 26, 2012 issued by the Japanese Patent Office in the corresponding Japanese Patent Application No. 2009-505969 (5 pages).
English language translation of Decision of Refusal dated Jul. 2, 2013 issued by the Japanese Patent Office in the corresponding Japanese Patent Application No. 2009-505969 (7 pages).
English language translation of Notification of Reason for Refusal dated Sep. 30, 2014 issued by the Japanese Patent Office in the corresponding Japanese Patent Application No. 2013-229171 (8 pages).
English language translation of Official Decision of Refusal dated May 12, 2015 issued by the Japanese Patent Office in the corresponding Japanese Patent Application No. 2013-229171 (8 pages).
English language translation of Pre-Appeal Examination Report drafting date Dec. 4, 2015 issued by the Japanese Patent Office in the corresponding Japanese Patent Application No. 2013-229171, Appeal No. 2015-016717 (2 pages).
English language translation of Notice of Final Rejection dated Jan. 29, 2014 issued by the Korean Patent Office in the corresponding Korean Patent Application No. 10-2008-7028155 (2 pages).
English language translation of Notice of Final Rejection dated Jul. 24, 2015 issued by the Korean Patent Office in the corresponding Korean Patent Application No. 10-2014-7015624 (4 pages).
Opposition filed by AGC on Sep. 13, 2013 in European Patent No. 2 013 013 and English language translation (13 pages).
Decision dated Sep. 27, 2013 in European Application No. 07 733 624.6 issued by the Chairman of the European Patent Office (2 pages).
Minutes of the Oral Proceedings Before the Opposition Division dated Oct. 14, 2013 issued by the European Patent Office in European Patent Application No. 07 733 624.6 (2 pages).
Opposition Decision dated Oct. 14, 2013 issued by the European Patent Office in European Patent Application No. 07 733 624.6 (4 pages).
Grounds of Appeal dated Feb. 24, 2014 filed by Pilkington Group Limited in the European Patent Office in European Patent Application No. 07 733 624.6 (24 pages).
Reply to the Grounds of Appeal dated Feb. 24, 2014 filed by Gleiss & Grosse in the European Patent Office in European Patent Application No. 07 733 624.6 (28 pages).
Response to the Patent Holder's Statement of Appeal dated Jun. 23, 2014 filed by AGC in the European Patent Office in European Patent Application No. 07 733 624.6 and English language translation (23 pages).
Annex to Opposition 10032017 in European Patent EP2013013B1 dated Mar. 13, 2017, 13 pages.
Notification of Reasons for Refusal dated Jul. 10, 2012 in Japanese Application No. 2009-505971 and English Translation (11 pages).
Opposition Filing dated Aug. 13, 2015 in European Patent No. 2013013 and English Translation (37 pages).
Opposition Filing dated Sep. 9, 2015 in European Patent No. 2013013 and English Translation (5 pages).
Opposition Filing dated Sep. 18, 2015 in European Patent No. 2013013 (2 pages).
Klosovvicz, S.J. "Optimization of Electrooptical Parameters of Polymer Dispersed Liquid Crystal Displays," Feb. 1993, Institute of Technical Physics, Military University of Technology, Poland.
English Translation of Examination Decision of invalidation Request dated Dec. 25, 2018 in Chinese Patent No. 200780019598.7 (14 pages).
Wu Yonghao, "Smart Wndow and Glass Coating", Industrial Material Magazine, 2004.03, No. 207, pp: 136-149 and partial English Translation (16 pages).
Notification of Reasons for Refusal dated Aug. 30, 2016 in Japanese Application No. 2015-179100 and English Translation (6 pages).
Notification of Reasons for Refusal dated May 31, 2016 in Japanese Application No. 2013-229171 and English Translation (29 pages).
Opposition Filing dated Sep. 14, 2015 in European Patent No. 2013013 and English Translation (11 pages).

\* cited by examiner

GLAZING

The present invention relates to a method of manufacturing a laminated glazing, in particular, a method of manufacturing a glazing containing a functional film.

In recent years, glazings having some form of additional functionality have become increasingly popular and sought-after. Typically, additional functionality is provided by using at least one ply of coated or tinted glass within a laminated glazing structure, to provide heat or UV-reflective properties. However, additional functionality can also be provided by including a functional device or film within a laminated glazing structure. Such devices or films may include lighting devices, such as LEDs (light emitting diodes), or switchable films, such as, LCDs (liquid crystal displays), or SPDs (suspended particle devices).

An SPD, such as that described in WO2005/102688 and available under licence from Research Frontiers is a film comprising a plurality of particles suspended within a liquid suspension medium, which are held within a polymer medium. The film is switchable between a dark state (when no is voltage applied), and a highly transparent state (when voltage is applied). The degree of relative alignment between the particles is determined by the applied AC voltage, such that an SPD-based device exhibits a variable optical transmission when a variable voltage is applied.

DE 100 43 141 discloses a glazing for use as a rooflight, which incorporates an SPD layer. Two plies of glass are formed into a double glazing structure having a partial vacuum in the gap between the plies, with an SPD layer deposited on the inner side of the lower glass ply. The SPD is switchable between a dark state and a light state.

It is preferable to be able to include a functional device, such as an SPD film within a laminated glazing structure, as the whole, or part of, the interlayer, as described in, for example, US2004/0257649, rather than using a partially evacuated double glazing structure. The interlayer used in typical laminated glazing constructions is a PVB (poly vinyl butyral) interlayer. In order to protect the SPD film within the interlayer, it is preferable that the edges of the film do not reach the edges of the glass. It is known to use a "picture frame" design, where three interlayers, rather than the usual one, are used to laminate a functional film within a glazing. A central layer, approximately the same thickness of the functional film, is cut such that the film can be placed within an interlayer frame. The film and interlayer frame are then placed between two further interlayers, and laminated between two plies of glass.

Figure 1:
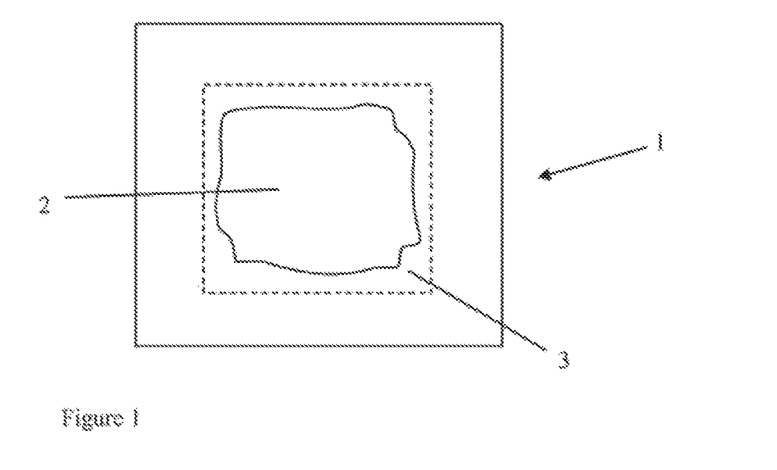
FIG. 1, as referred to above, is a schematic plan view of a laminated glazing having an SPD film laminated therein.

As part of the laminating process, the SPD film, interlayers and plies of glass and may be autoclaved, and subjected to pressure at elevated temperature. However, when PVB interlayers are used, the lamination temperature can cause a permanent degradation in the optical performance of the SPD film. In addition, if the final laminate is subjected to prolonged heat exposure the edge region of the SPD film can become damaged and the switching function impaired. FIG. 1 shows a schematic plan view of a glazing 1 having an SPD film 2 laminated therein. A border region 3, which is uneven in thickness has appeared around the edge of the SPD film 2. The size of this non-functioning or impaired region increases with autoclaving temperature and duration, and is non-reversible. The dotted line in FIG. 1 illustrates the "picture frame" construction, and shows the position of the actual edge of the SPD film 2.

Clearly, the presence of a border region within the SPD film is unacceptable from a quality control point of view, as it affects the visual appearance of the glazing. There is therefore a need for a manufacturing method which enables an SPD film to be included within a laminated glazing, which minimises or prevents degradation of the film occurring at any point during the manufacture of the glazing.

The present invention aims to address these problems by providing a laminated glazing comprising first and second plies of glass having an interlayer structure laminated therebetween, the interlayer structure comprising a first sheet of an interlayer material framing a suspended particle device film incorporated therein, the first sheet of interlayer material being laminated between a second and a third sheet of an interlayer material, the suspended particle device film being in contact with the second and third sheets of interlayer material, at least one of which is in contact with and co-extensive with one of the first and second plies of glass wherein the interlayer material components do not comprise a plasticizer.

It has been appreciated that migration and solution behaviour of the plasticizer within interlayer materials such as PVB is at least partly responsible for the border region observed in laminated glazings containing SPD films. By providing a structure where the SPD film is in contact with a material containing little or no plasticizer, the observed damage can be reduced or even eliminated.

At least one of the first, second and third sheets of interlayer material is one of ethylene vinyl acetate copolymer, polyurethane, polycarbonate, poly vinyl chloride or a copolymer of ethylene and methacrylic acid.

Preferably, the laminated glazing further comprises a fourth sheet of interlayer material and a bather layer, the barrier layer being between the third and fourth sheets of interlayer material. Preferably, the barrier layer is poly ethylene terephthalate. The fourth sheet of interlayer material is preferably poly vinyl butyral. The fourth sheet of interlayer material may be coloured and/or has acoustic properties.

Alternatively, the suspended particle device film may comprise a coloured substrate.

Alternatively, the laminated glazing may further comprise a poly ethylene terephthalate substrate having a heat reflective solar control coating and a fifth sheet of an interlayer material, interposed between the fourth sheet of interlayer material and the second ply of glass.

At least one sheet of interlayer material may have solar control properties.

The laminated glazing may comprising at least one of a solar control, heat reflective, low-emissivity, hydrophobic or hydrophilic coating.

Alternatively, the laminated glazing may comprise a third ply of glass, separated from the second ply of glass by an air gap.

The present invention will now be described by way of example only, and with reference to the accompanying drawings in which.

It has been appreciated that there is at least one mechanism that influences the formation of the non-functioning or impaired edge region within the SPD film in a laminated glazing. By determining this mechanism, it has been possible to develop a laminated glazing where the presence of the border region within the SPD film is minimised or eliminated.

PVB interlayer materials generally contain a plasticizer, which determines the rigidity and flexibility of the interlayer, as well as influencing the mechanical strength, as well as other components, such as additives to control resistance to UV (ultra-violet light). The clear region may be formed by the migration of plasticizer and other components of the PVB interlayer material into the SPD film. Either individually, or in combination, the plasticizer and additives may disrupt or interfere with the separation and suspension of particles, or the stability of the liquid pores. These effects result in a reduction in the function of the SPD film. The functionality of the border region is not uniform, and may give rise to a region that is dark in appearance and does not switch, or is bright in appearance and switches more intensely. In each case, the border region appears to fade out at the edge of the film. This observation supports the idea that the border formation mechanism is based on diffusion. Indeed, it is known that the diffusion rate of a mobile component within a host material increases with temperature, and observations have shown the border grows more quickly at higher temperatures. The appearance of the border region within the SPD film, and not surrounding the film in the interlayer indicates that the diffusion of plasticizer into the SPD film appears to dominate any diffusion of SPD particles out of the film into the surrounding interlayer material.

The presence of plasticizer within the interlayer material is therefore an important factor in the creation of the border region within the SPD film. By the use of low plasticizer content or plasticizer free interlayer materials, or the use of plasticizers which do not diffuse into the film, the border region may be reduced in size or even eliminated, depending on the effect of other interlayer material components. Suitable interlayer materials include EVA (a copolymer of ethylene vinyl acetate), PVC (poly vinyl chloride) PU (polyurethane), PC (polycarbonate) and copolymers of ethylene and methacrylic acid. If an interlayer containing little plasticizer is used, preferably the amount of plasticizer contained therein is less than that of standard automotive PVB.

Figure 2:
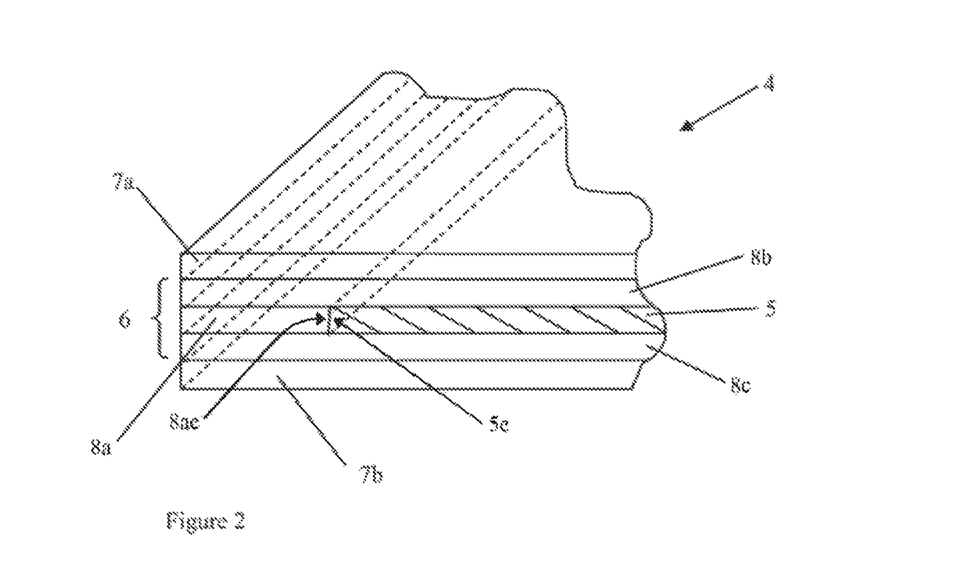
FIG. 2 is a schematic cross-section showing the construction of a laminated glazing having an SPD film laminated therein.

In order to compare the effects of plasticizer-free interlayer materials with a PVB interlayer, two sets of samples were made, one set with a PVB interlayer structure and one set with an EVA (ethylene vinyl acetate) interlayer structure. The PVB interlayer used was a RZN-12 interlayer, available from Sekisui Chemical Co. Ltd, and the EVA interlayer used was an EN interlayer, also available from Sekisui Chemical Co. Ltd. FIG. 2 is a schematic drawing showing the construction of a glazing having an SPD film laminated therein. The glazing 4 has an SPD film 2 laminated within an interlayer structure 6, which is itself laminated between two plies of glass 7a, 7b. The laminated structure 6 comprises three layers of interlayer material, 8a, 8b, 8c. The first interlayer 8a also has a region cut out of the centre in which the SPD film sits, such that the first interlayer 8a forms the "picture frame". Preferably the thickness of the SPD film 5 is of the same order as the first interlayer 8a. The first interlayer 8a is laminated between second 8b and third 8c interlayers, which are co-extensive with the plies of glass 7a, 7b. A peripheral edge 5e of the SPD film 5 faces an interior edge 8ae of the first interlayer 8a.

Samples were prepared in the following manner. Firstly, the connectors were prepared. The SPD films used in the samples were polymer dispersed SPD films available from Research Frontiers Incorporated, 240 Crossways Park Drive, Woodbury, N.Y. 11797, USA. An electrical connection was made to each ITO (indium tin oxide) layer within the SPD film, whilst maintaining electrical isolation between the ITO layers.

Secondly, once the soldering was completed, the samples were laid up for lamination. Three sheets of interlayer material (0.76 mm, 0.38 mm and 0.76 mm thick respectively for the PVB interlayer material, or 0.40 mm thick for all three EVA interlayers) were placed between the two plies of glass to be used to form the sample, and trimmed to the external size of the plies of glass. The SPD film was then used as a template to mark a hole in the sheet of 0.38 mm/0.40 mm thick interlayer material, and a hole cut approximately 1-2 mm oversize of the mark, to minimise contact between the interlayer material and the edge of the SPD film. This forms the "picture frame" in which the SPD film is placed. The sheets of interlayer material and SPD film were then laid up on the glass to create the structure shown in FIG. 2.

Thirdly, the samples were laminated. Each sample was vacuum bagged and placed in an oven at 105° C. for 40 minutes. Once the lamination cycle had been completed, both samples were then heated at elevated temperature at atmospheric pressure for various time periods, in order to determine the extent to which a border region appeared under extreme conditions. Once this heating was complete, the samples were inspected visually.

No border region was observed in samples having an EVA interlayer, but the width of the border region in the samples having a PVB interlayer increased with increasing temperature. These results indicate that the mechanisms discussed above, whilst not necessarily being the entire reason for the appearance of the border region, are likely to be dominant in its formation.

When a glazing in accordance with the present invention is used as an automotive glazing, such as a rooflight, a sidelight or a backlight, it is desirable to be able to control the colour of the glazing. One way in which this may be done is to use at least one ply of glass which is tinted, for example, having an LT (light transmission) when measured using CIE Illuminant A of less than 87% at 2.1 mm. In particular, glasses such as those known as GALAXSEE™ and SUNDYM™, available from Pilkington Group Limited, may be used. Preferably the plies of glass used are annealed or semi-toughened before lamination.

An alternative approach, when at least one ply of clear (having an LT of greater than 88%, measured using CIR Illuminant A) is used, is to include at least one layer of a tinted PVB in the laminated structure in which the SPD film is placed. However, as discussed above, any plasticizer within the PVB may affect the structure and appearance of the SPD film. In order to prevent this, it is desirable to remove any contact between the edge of the SPD film and the PVB interlayer. This may be done in a number of ways, for example, by using coloured EVA interlayers. Alternatively, colour may be added (by means of a dye, for example) to the PET interlayers which form the substrates of the SPD film 5. The amount of colour used may vary from a low level of tint, to hide any off-white colour of the SPD film 5 when not in use, to heavily tinted to provide some thermal and/or optical control to the glazing.

Figure 3:
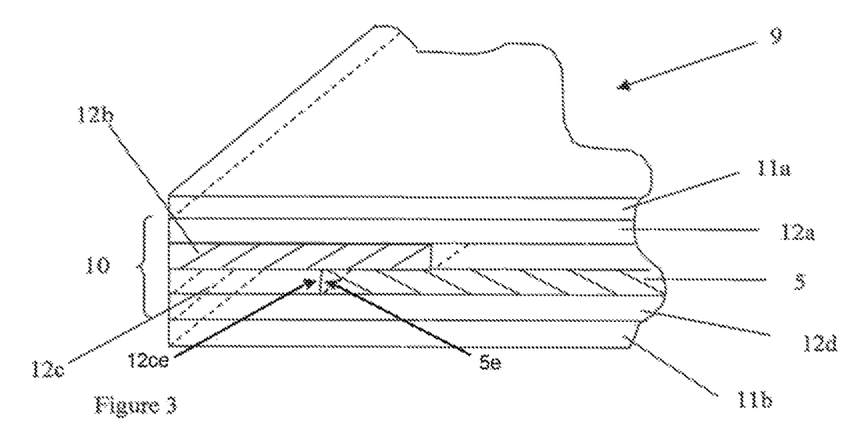
FIG. 3 is a schematic cross-section showing the construction of a laminated glazing having an SPD film laminated therein, showing a second picture frame design.

Alternatively, a coloured PVB interlayer may be included by means of a second "picture frame" construction. FIG. 3 is a schematic cross-section of the structure of a glazing 9 having a second "picture frame" construction. An interlayer structure 10 is laminated between two plies of glass 11a, 11b. The interlayer structure 10 comprises four layers: an upper layer 12a, formed of a coloured PVB, which is co-extensive with the upper glass ply 11a, a second picture frame layer 12b, formed of a plasticizer free, or low plasticizer material, such as PET, a first picture frame layer 12c, containing the SPD film 5, and a lower layer 12d, formed of a plasticizer free, or low plasticizer material, and co-extensive with the lower ply of glass 11b. The second picture frame layer 12b prevents the edge of the SPD film 5 from coming into contact with the coloured PVB interlayer, thus preventing degradation of the SPD film 5. The coloured PVB interlayer 12a may contact the SPD film 5 in a central region, to ensure adhesion within the interlayer structure 10. A peripheral edge 5e of the suspended particle device film 5 faces an interior edge 12ce of the first picture frame layer 12c.

Figure 4:
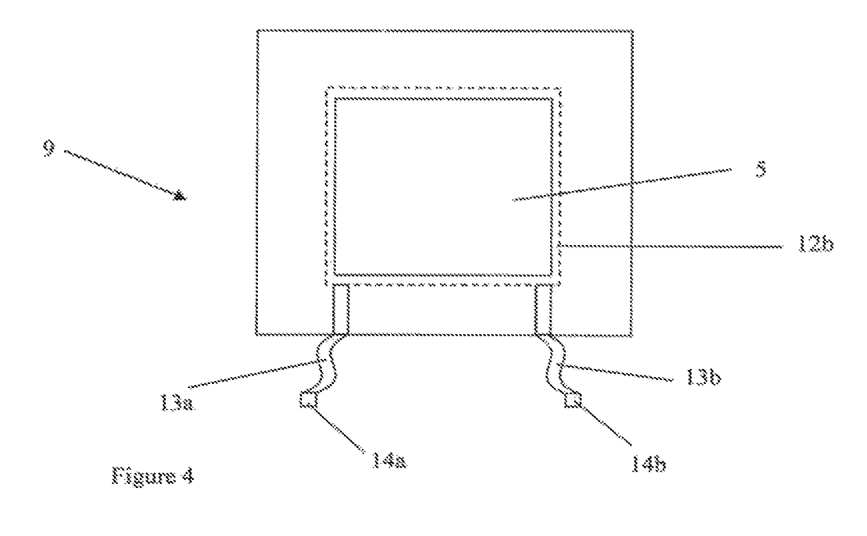
FIG. 4 is a schematic plan view of a laminated glazing having an SPD film laminated therein, showing a second picture frame design.

FIG. 4 is a schematic plan view of a glazing having a first picture frame layer 12c (represented by a dotted line) containing an SPD film 5, showing the second picture frame layer 12b overlapping the first picture frame layer 12c. Busbars 13a, 13b and electrical connectors 14a, 14b are provided to allow the sample to be connected to a power source.

For a glazing to be included in a vehicle, for example, as a rooflight, the busbars and electrical connectors between the SPD film and the wiring harness of the vehicle may be hidden by an obscuration band. This is a band of fired, black ceramic ink around the edge of the upper ply of glass, which acts to cover the adhesive holding the glazing into a vehicle, and electrical connections. The purpose of the band is two-fold, firstly aesthetic, and secondly, to prevent damage of adhesive or other components from UV exposure. The obscuration band may also hide the edges of the SPD film.

When a coloured EVA interlayer material is used in the glazing construction, or a coloured PET substrate used in the manufacture of the SPD film, a clear PVB interlayer material having acoustic properties may be used. Alternatively, a coloured acoustic PVB interlayer material may be used.

Figure 5:
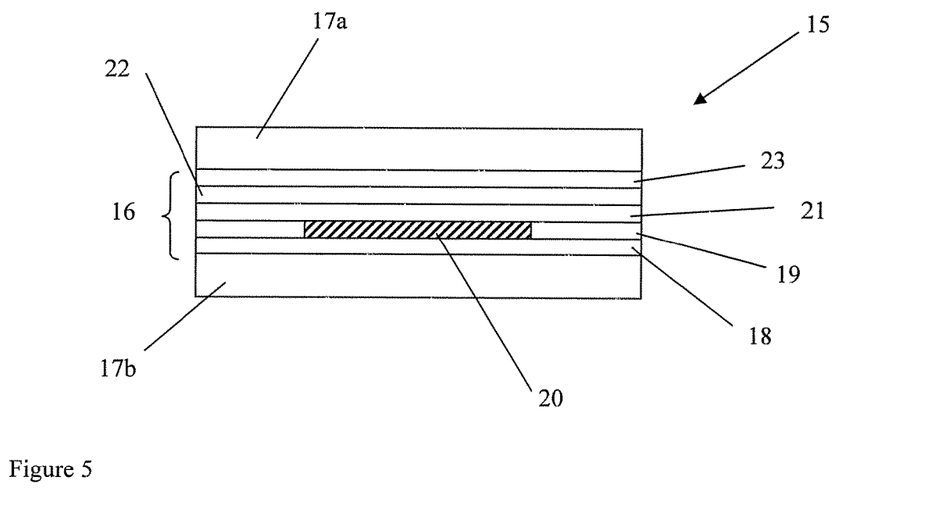
FIG. 5 is a schematic cross section view of a further laminated glazing in accordance with the present invention.

FIG. 5 is a schematic cross section view of a glazing 15 comprising a five-layer interlayer structure 16 laminated between two plies of glass 17a, 17b. Preferably, the upper ply of glass 17a is clear, and is provided with a heat reflective solar control coating on its inner surface. The lower ply of glass 17b may be clear or tinted. The interlayer structure 16 comprises a first interlayer 18, a second interlayer 19, having an SPD film 20 incorporated therein, a third interlayer 21, a PET substrate 22 and a fourth interlayer 23. Preferably, the first 18, second 19 and third 21 interlayers are formed of EVA or other suitable interlayer material, as discussed above. The fourth interlayer is preferably a tinted PVB interlayer. In addition, the PVB interlayer may have acoustic or solar/thermal control properties. By using a five-layered interlayer structure, a barrier is provided between the SPD film 19 and a PVB interlayer, removing any issues due to interlayer component migration.

It may be desirable, as an alternative to using a coated glass to provide solar control, to use an interlayer material which provides a degree of solar control. For example, additives such as pigments or nanoparticle systems including $LaB_6$ or ITO (indium tin oxide), are known for use with PVB interlayers, and may be used in an EVA interlayer in the laminated glazing structure of the present invention.

Figure 6:
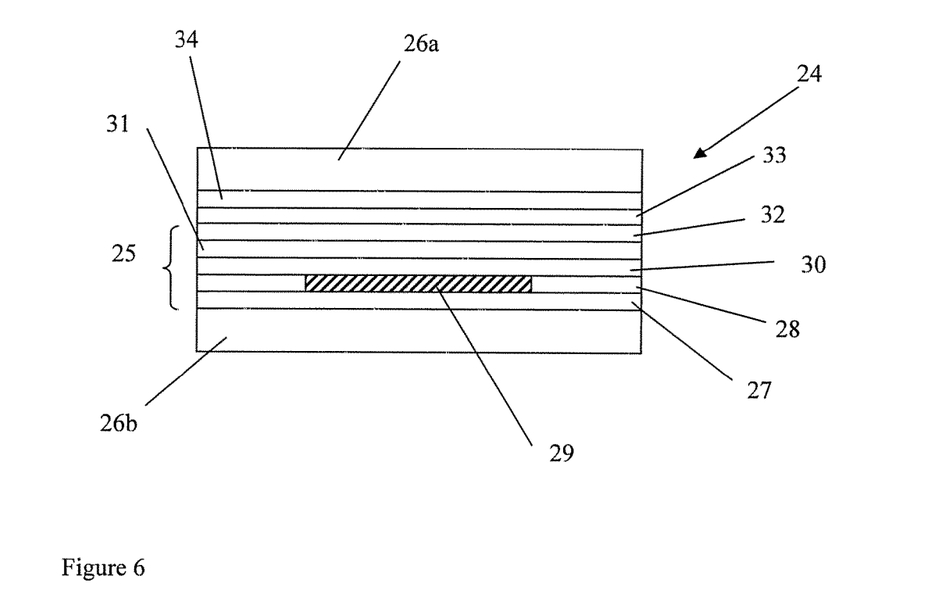
FIG. 6 is a schematic cross section view of a further laminated glazing in accordance with the present invention.

However, rather than using a solar control interlayer or providing a coating on one of the plies of glass, it may be desirable to include a solar reflective, in particular, a double-layered silver coating, on a PET substrate included within an interlayer structure in a laminated glazing. FIG. 6 is a schematic cross section view of a further laminated glazing in accordance with the present invention, and shows a glazing 24 comprising a seven-layer interlayer structure 25 laminated between two plies of glass 26a, 26b. Preferably, the upper ply of glass 26a is clear, although the lower ply of glass 26b may be clear or tinted. The interlayer structure 25 comprises a first interlayer 27, a second interlayer 28, having an SPD film 29 incorporated therein, a third interlayer 30, a first PET substrate 31, a fourth interlayer 32, a second PET substrate 33, having a double silver layer solar control coating, and a fifth interlayer 34. Preferably, the fourth interlayer 32 is a tinted PVB interlayer, and the fifth interlayer 34 a clear PVB or other suitable interlayer material. By using a coated PET substrate to provide solar control and a tinted PVB interlayer, it is possible to produce a colour control glazing without needing to use heavily tinted glasses.

Particularly preferred glazing constructions utilise EVA interlayers only. These interlayers may be combined with a coating on either ply of glass, or with a coated PET substrate to provide appropriate solar control.

Preferably, when a tinted interlayer material is used, it is colour matched to a tinted glass, such as GALAXSEE™ or SUNDYM™, available from Pilkington Group Limited, or a blue, grey or green glass.

Suitable functional coatings for use with such a glazing construction when used as a rooflight include low-emissivity coatings, conductive coatings and solar control coatings. A low emissivity coating is a coating which when applied to clear, 3 mm thick float glass, results in the coated glass having an emissivity in the range of 0.05 to 0.45, the actual value being measured in accordance with EN 12898 (a published standard of the European Association of Flat Glass Manufacturers). Hard coatings generally have emissivities between 0.15 and 0.2, whereas off-line coatings generally have emissivities of 0.05 to 0.1. As a comparison, uncoated 3 mm thick float glass has an emissivity of 0.89.

A hard (or pyrolytic) low emissivity coating may comprise a single layer of a metal oxide, preferably a transparent, electrically conductive oxide. Oxides of metals such as tin, zinc, indium, tungsten and molybdenum may be present in the metal oxide layer. Typically, the coating comprises a further dopant, such as fluorine, chlorine, antimony, tin, aluminium, tantalum, niobium, indium or gallium, for example, fluorine-doped tin oxide or tin-doped indium oxide may be used. Such coatings are generally provided with an underlayer, such as silicon or silicon oxynitride. The underlayer acts as a barrier to control migration of alkali metal ions from the glass and/or to suppress iridescent reflection colours caused by variations in thickness of the low emissivity layer.

Off-line (typically sputtered) low emissivity coatings typically comprise a multilayer coating stack, normally including at least one metal layer or electrically conductive metal compound layer, and a dielectric layer. Silver, gold, copper, nickel or chromium may be used as the metal layer, whereas indium oxide, antimony oxide or the like may be used as the electrically conductive compound. Typical multilayer stacks comprise one or two layers of silver deposited between layers of a dielectric such as an oxide of silicon, aluminium, titanium, vanadium, tin, or zinc. Individual layers of such coatings are typically tens of nanometers in thickness. Low emissivity coatings may be provided on either surface of the upper and lower plies of glass in the laminated glazing structure, depending on the combination of interlayers used and desired thermal performance.

Typical solar control coatings comprise layers of silver or tin oxide, and control the amount of heat absorbed through the coated glass. Solar control and low emissivity coatings may also be electrically conductive, and so not only provide functionality to the glass in terms of emissivity and heat transmission, but can form an electrically conductive substrate for mounting electrically conductive devices such as LEDs, sensors and cameras.

A heat reflective solar control coating, for example, a two-layer silver coating, may also be used. Typically, the solar heat reflected by such coatings is greater than 23%, measured in accordance with ISO9050:E (2003), air mass 1.5. Metallic heat reflective coatings may also be electrically conductive, and are particularly useful if the outer ply of glass is of clear glass. Such coatings are typically provided on the inner side of an outer ply of clear glass.

Figure 7:
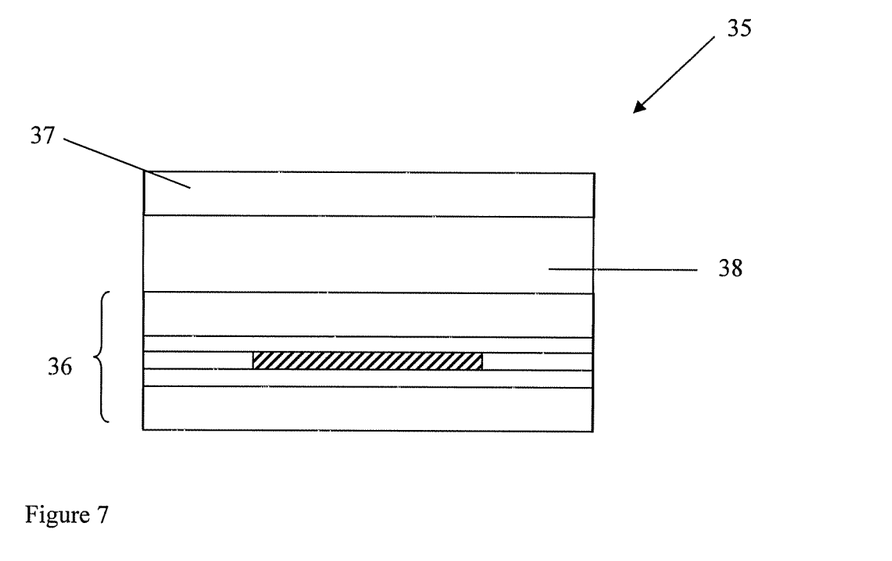
FIG. 7 is a schematic cross section view of a double-glazed structure including an SPD film in accordance with the present invention.

Alternatively, the SPD film may be included within a double-glazed structure. FIG. 7 is a schematic side view of a double-glazed structure 35 including an SPD. The double-glazed structure 35 comprises any of the laminated glazing structures described above, generally represented by reference number 36 in FIG. 7, in combination with an additional upper ply of glass 37, and separated from the glazing structure by an air gap 38. The additional upper ply of glass 37 is toughened and preferably tinted, for example, a dark tint such as that sold as GALAXSEE™, available from Pilkington Group Limited.

The advantage of using a structure including a heat reflective coating (either on a ply of glass or on a separate interlayer) or a double glazed structure including an air gap is that the amount of heat absorbed by the SPD film can be reduced. As the migration of plasticizer and other interlayer material components is a diffusion process, any extra heat absorbed by the SPD film will increase the size of the clear border region. This is a particular problem for glazings that will be used as rooflights in vehicles, where the SPD film may become damaged in-situ.

The present invention therefore provides a glazing which is switchable to alter the amount of light entering a vehicle through the glazing.

Further embodiments of the invention, within the scope of the appended claims, will be apparent to those skilled in the art.

The invention claimed is:

1. A laminated glazing comprising first and second plies of glass having an interlayer structure laminated therebetween, the interlayer structure comprising a first sheet of an interlayer material having a hole therein, the first sheet of interlayer material being directly laminated between a second and a third sheet of an interlayer material, there being a suspended particle device film positioned in the hole in the first sheet of interlayer material, the suspended particle device film being coplanar with the first sheet of interlayer material and being framed by the first sheet of interlayer material,
wherein the interlayer material components of the first sheet do not comprise a plasticizer, or comprise a plasticizer that does not migrate into the suspended particle device film,
wherein the first sheet of interlayer material is one of ethylene vinyl acetate copolymer, polyurethane, or poly vinyl chloride.

2. The laminated glazing of claim 1, wherein the suspended particle device film comprises a coloured substrate.

3. The laminated glazing of claim 1, further comprising a poly ethylene terephthalate substrate having a heat reflective solar control coating and a fifth sheet of an interlayer material, interposed between the fourth sheet of interlayer material and the second ply of glass.

4. The laminated glazing of claim 1, wherein at least one sheet of interlayer material has solar control properties.

5. The laminated glazing of claim 1, further comprising at least one of a solar control, heat reflective, low-emissivity, hydrophobic or hydrophilic coating.

6. The laminated glazing of claim 1, further comprising a third ply of glass, separated from the second ply of glass by an air gap.

7. The laminated glazing of claim 1, wherein the thickness of the suspended particle device film is the same as the first layer of interlayer material.

8. The laminated glazing of claim 1, wherein at least one of the second and third sheets of interlayer material is in direct contact with and co-extensive with one of the first and second plies of glass.

9. The laminated glazing of claim 1, wherein a peripheral edge of the suspended particle device film is in direct contact with an interior edge of the first sheet of interlayer material, the interior edge of the first sheet of interlayer material defining the hole in the first sheet of interlayer material.

10. The laminated glazing of claim 1 further comprising a fourth sheet of interlayer material and a barrier layer, the barrier layer being between the third and fourth sheets of interlayer material.

11. The laminated glazing of claim 10, wherein the barrier layer is poly ethylene terephthalate.

12. The laminated glazing of claim 10, wherein the suspended particle device film comprises a coloured substrate.

13. The laminated glazing of claim 10, further comprising a poly ethylene terephthalate substrate having a heat reflective solar control coating and a fifth sheet of an interlayer material, interposed between the fourth sheet of interlayer material and the second ply of glass.

14. The laminated glazing of claim 10, wherein at least one sheet of interlayer material has solar control properties.

15. The laminated glazing of claim 10, further comprising at least one of a solar control, heat reflective, low-emissivity, hydrophobic or hydrophilic coating.

16. The laminated glazing of claim 10, further comprising a third ply of glass, separated from the second ply of glass by an air gap.

17. The laminated glazing of claim 10, wherein the thickness of the suspended particle device film is the same as the first layer of interlayer material.

18. The laminated glazing of claim 10, wherein the fourth sheet of interlayer material is poly vinyl butyral.

19. The laminated glazing of claim 18, wherein the fourth sheet of interlayer material is coloured and/or has acoustic properties.

20. A laminated glazing comprising first and second plies of glass having an interlayer structure laminated therebetween, the interlayer structure comprising a first sheet of an interlayer material having a hole therein, there being a suspended particle device film positioned in the hole in the first sheet of interlayer material, the suspended particle device film being coplanar with the first sheet of interlayer material and being framed by the first sheet of interlayer material, a thickness of the suspended particle device film being the same as a thickness of the first sheet of interlayer material, the first sheet of interlayer material being directly laminated between a second and a third sheet of an interlayer material,     wherein the interlayer material components of the first sheet do not comprise a plasticizer, or comprise a plasticizer that does not migrate into the suspended particle device film,     wherein the first sheet of interlayer material is ethylene vinyl acetate copolymer, and     wherein the second sheet of interlayer material is ethylene vinyl acetate copolymer and the third sheet of interlayer material is ethylene vinyl acetate copolymer.

21. The laminated glazing of claim 20, wherein a peripheral edge of the suspended particle device film is in direct contact with an interior edge of the first sheet of interlayer material, the interior edge of the first sheet of interlayer material defining the hole in the first sheet of interlayer material.

22. A laminated glazing comprising first and second plies of glass having an interlayer structure laminated therebetween, the interlayer structure comprising a first sheet of an interlayer material having a hole therein, the first sheet of interlayer material being directly laminated between a second and a third sheet of an interlayer material, there being a suspended particle device film positioned in the hole in the first sheet of interlayer material, the suspended particle device film being coplanar with the first sheet of interlayer material and being framed by the first sheet of interlayer material,     wherein the interlayer material components of the first sheet do not comprise a plasticizer, or comprise a plasticizer that does not migrate into the suspended particle device film,     wherein the first sheet of interlayer material is ethylene vinyl acetate copolymer,     wherein the second sheet of interlayer material is ethylene vinyl acetate copolymer and the third sheet of interlayer material is ethylene vinyl acetate copolymer, and     wherein at least one of the second and third sheets of interlayer material is in direct contact with and co-extensive with one of the first and second plies of glass.

23. The laminated glazing of claim 22, wherein the second sheet of interlayer material is in direct contact with and co-extensive with the first glass ply and the third sheet of interlayer material is in direct contact with and co-extensive with the second glass ply.

24. The laminated glazing of claim 22, wherein a peripheral edge of the suspended particle device film is in direct contact with an interior edge of the first sheet of interlayer material, the interior edge of the first sheet of interlayer material defining the hole in the first sheet of interlayer material.

\* \* \* \* \*